United States Patent [19]
Kai

[11] Patent Number: 6,154,588
[45] Date of Patent: Nov. 28, 2000

[54] DISPERSION COMPENSATION APPARATUS

[75] Inventor: Yutaka Kai, Kawasaki, Japan

[73] Assignee: Fujitsu Limited, Kawasaki, Japan

[21] Appl. No.: 09/030,998

[22] Filed: Feb. 26, 1998

[30] Foreign Application Priority Data

Oct. 20, 1997 [JP] Japan ................................. 9-286981

[51] Int. Cl.[7] .................................................. G02B 6/34
[52] U.S. Cl. ........................ 385/27; 385/37; 359/161; 359/173; 359/341
[58] Field of Search ............................. 385/27, 123, 37; 359/161, 341, 173

[56] References Cited

U.S. PATENT DOCUMENTS

| | | | |
|---|---|---|---|
| 5,475,528 | 12/1995 | LaBorde ................................. | 359/341 |
| 5,608,562 | 3/1997 | Delavaux et al. ..................... | 359/161 |
| 5,701,188 | 12/1997 | Shigematsu et al. ................. | 359/161 |
| 5,953,471 | 9/1999 | Espindola et al. .................... | 385/37 |
| 5,966,228 | 10/1999 | Akiba et al. ........................... | 359/173 |

FOREIGN PATENT DOCUMENTS

| | | |
|---|---|---|
| 4-204719 | 7/1992 | Japan . |
| 5-206546 | 8/1993 | Japan . |
| 6-112907 | 4/1994 | Japan . |

OTHER PUBLICATIONS

Nakazawa et al., Transactions of the Institute of Electronics, Information and Communication Engineers, OPE96–123, pp. 79–84, 1996, No month.

T. Kashiwada et al. OFC '95 TupI, 1995, No month.

Oguma et al., Optical Gain Equalizer for Optical Fiber Amplifier, p. 578, No date.

*Primary Examiner*—John D. Lee
*Assistant Examiner*—Ellen E. Kim
*Attorney, Agent, or Firm*—Staas & Halsey LLP

[57] ABSTRACT

Dispersion compensation having a flat loss characteristic is performed. Overall wavelength dependence is made flat by using a passive device, such as a fiber Bragg grating having a transmission characteristic compensating for the wavelength dependent loss characteristic of a dispersion-compensating fiber, or an optical amplifier having a gain characteristic compensating for the wavelength dependent loss characteristics.

24 Claims, 6 Drawing Sheets

RF SIGNAL INPUT

Fig.11

DISPERSION COMPENSATION APPARATUS

BACKGROUND OF THE INVENTION

1. Field of the Invention

The present invention relates to a dispersion compensation apparatus for compensating for chromatic dispersion in an optical transmission line and, more particularly, to a dispersion compensation apparatus suitable for the transmission of wavelength-division multiplexed signals.

2. Description of the Prior Art

Development of higher-capacity optical communication systems is needed for the construction of future multimedia networks. So far, time-division multiplexing (TDM), optical time-division multiplexing (OTDM), wavelength-division multiplexing (WDM), etc. have been actively studied as multiplexing techniques having the potential of being able to achieve ultra high-capacity transmission. Among them, WDM transmission techniques hold great promise as a means for realizing a flexible lightwave network in which cross connects, branching and insertion, and multiplexing of different kinds of services are performed at the optical level by utilizing the wide gain region of erbium-doped optical-fiber amplifiers (EDFAs).

On the other hand, when performing optical transmission in the 1.5-$\mu$m wavelength range by using 1.3-$\mu$m single-mode fiber (SMF), it a general practice to cancel chromatic dispersion in a transmission line by using a dispersion-compensating fiber (DCF).

When using DCF in WDM transmission, if the operating wavelength range is made wide, a tilt (differences in loss) occurs along the DCF because of the wavelength dependence of DCF loss. This presents a major problem in transmission through multiple repeaters. For example, when transmitting 32 wavelengths with a channel spacing of 0.8 nm, a bandwidth of about 26 nm is needed, but it is difficult to even out losses in the DCF over such a wide band (for example, to within ±0.1 dB). Furthermore, when wavelength-division multiplexing further increases in capacity in the future, it is expected to use a bandwidth of 30 nm or wider, and in that case, making the DCF loss wavelength-independent will become a major challenge.

For example, when transmitting signals through SMF with 80-km linear amplifier repeater spacing, DCFs each with a dispersion value of around −1000 to −2000 ps/nm are needed. For the currently available DCF to have a total dispersion of −1000 to −2000 ps/nm will require a fiber length of about 10 km. If the WDM signal wavelength range is from 1530 nm to 1570 nm, since the DCF loss difference in that operating wavelength range is about 0.1 dB/km, a difference of about 1 dB will occur when a 10-km DCF is used. In transmission through several sections of linear amplifier repeaters, a total slope of 5 to 6 dB will occur in the DCFs. This will result in different S/Ns for different channels, and hence variations in transmission characteristics, thus causing a serious problem.

SUMMARY OF THE INVENTION

Accordingly, it is an object of the present invention to provide a dispersion compensation apparatus having a flat loss characteristic over the operating wavelength range.

According to the present invention, there is provided a dispersion compensation apparatus comprising: a dispersion-compensating fiber for compensating for chromatic dispersion in a transmission line; and compensating means for compensating for the wavelength dependence of losses in the dispersion-compensating fiber.

Preferably, the compensating means includes a passive device, such as a fiber Bragg grating or a Fabry-Perot etalon filter, that has a characteristic compensating for the wavelength dependence of losses in the dispersion-compensating fiber.

Also, preferably, the compensating means includes an optical amplifier which is connected in series with the dispersion-compensating fiber, and whose gain has such a wavelength dependence as to compensate for the wavelength dependence of losses in the dispersion-compensating fiber.

DESCRIPTION OF THE PREFERRED EMBODIMENTS

Dispersion-compensating fiber (DCF) has high reliability, long-term stability, and an excellent temperature characteristic, and is the only dispersion compensator commercially available at present. The dispersion-compensating fiber is used to compensate for dispersion in a transmission line, and each fiber is usually installed with an in-line optical amplifier. To solve the problem of DCF loss unevenness, the following two approaches are considered.

I. To even out the losses by adding a passive device (filter) to the dispersion-compensating fiber (DCF)

II. To even out the losses in the dispersion-compensating fiber (DCF) actively within the optical amplifier Embodiments concerning the respective approaches will be described below.

Figure 1:
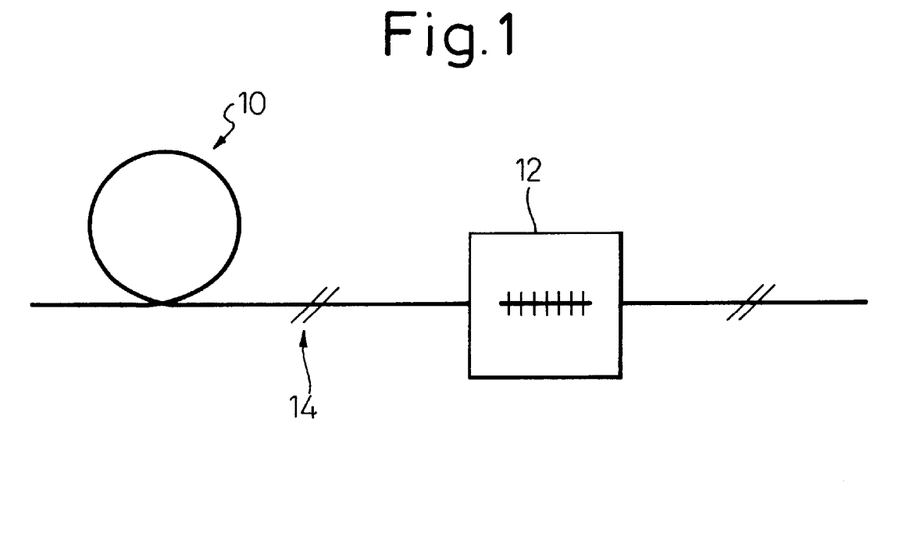
FIG. 1 is a diagram showing a dispersion compensation apparatus according to a first embodiment of the present invention.
Figure 2:
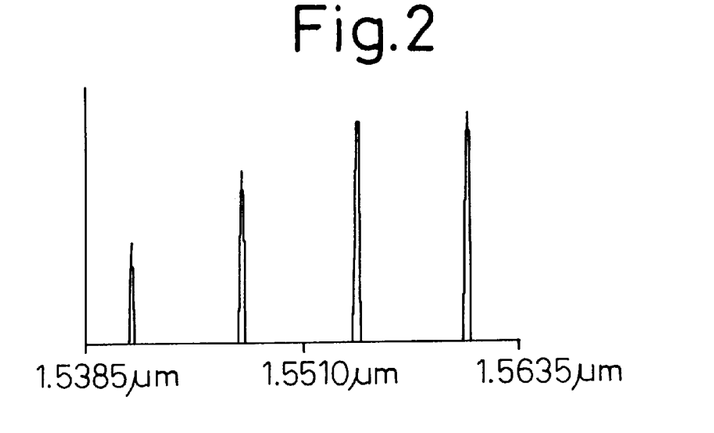
FIG. 2 is a diagram showing the spectrum of a WDM signal output from a DCF.
Figure 3:
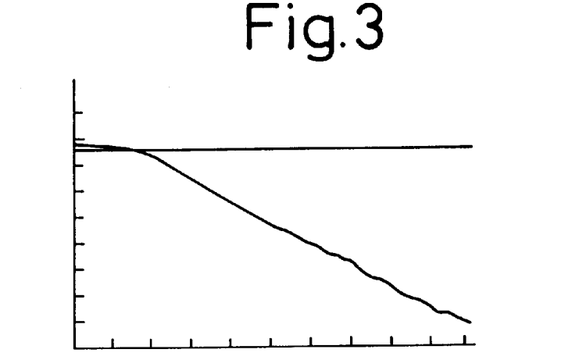
FIG. 3 is a diagram showing one example of the transmission characteristic of an FBG.
Figure 4:
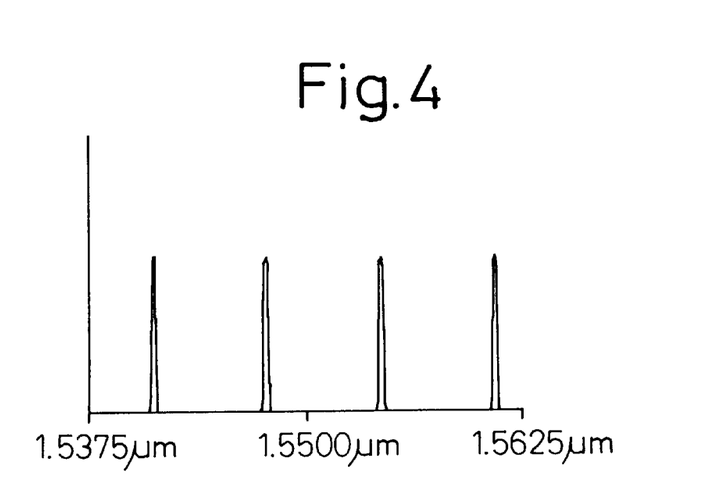
FIG. 4 is a diagram showing the spectrum of the WDM signal output from the FBG.
Figure 5:
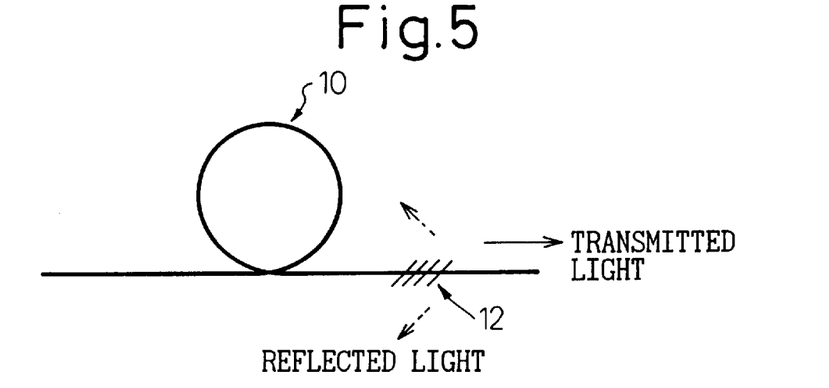
FIG. 5 is a diagram showing one example of the dispersion compensation apparatus of FIG. 1.
Figure 6:
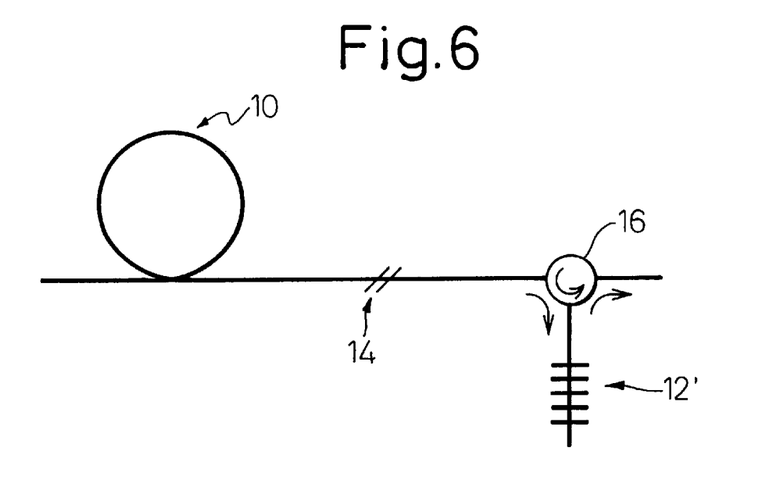
FIG. 6 is a diagram showing another example of the dispersion compensation apparatus of FIG. 1.

FIG. 1 shows a first embodiment of the present invention. When a flat, slopeless WDM signal is input to the DCF 10, a loss difference (slope) such as the one illustrated in FIG. 2 occurs because of the wavelength dependence of the DCF loss. Here, a WDM signal with a power slope is input to a fiber Bragg grating (FBG) 12. The FBG 12 used here has a transmission characteristic, such as that shown in FIG. 3, able to cancel out the slope corresponding to the length of one DCF. If the grating is formed obliquely, reflected light does not propagate backward through the fiber from which the light came, but is radiated into the clad and scattered. The FBG 12 may be placed before or after the DCF 10. By using the FBG 12 having the characteristic shown in FIG. 3, a WDM signal effectively free from loss differences can be obtained as shown in FIG. 4. It is also possible to form the FBG 12 directly within the DCF 10, as shown in FIG. 5. That is, if the grating is formed in a portion of the DCF core, thus providing a slope in its transmission characteristic, and dispersion compensation is performed using such a DCF, optical power loss within the dispersion compensator can also be reduced since the number of splice points, shown by 14 in FIG. 1, decreases. In this case, if the grating is formed obliquely, the reflected light does not propagate backward, but is scattered through the clad, as shown in FIG. 5. Further, instead of using the transmission-type FBG, a reflection-type FBG 12' may be used in conjunction with an optical circulator 16, as shown in FIG. 6. In this case, the configuration shown in FIG. 7 is also possible.

Figure 7:
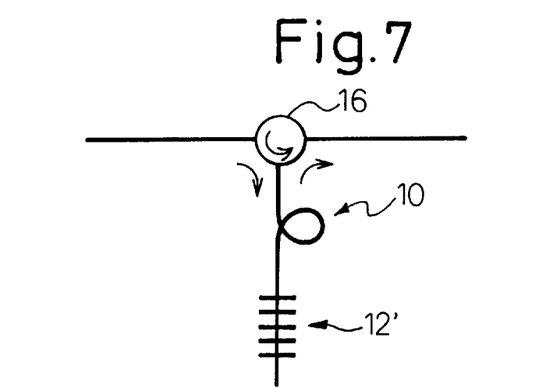
FIG. 7 is a diagram showing another example of the dispersion compensation apparatus of FIG. 1.

In FIG. 7, the DCF 10 is placed inside the optical circulator 16, and the FBG 12' is connected at the farther (i.e., remote) end of the DCF 10. The losses in the DCF 10 can be evened out by providing the FBG 12' with a sloping transmission characteristic. In this configuration, since the light makes one round trip (i.e., passes twice) through the DCF 10, the length of the DCF can be reduced to one half.

A wavelength range of 1530 nm to 1570 nm is used as an example of the operating wavelength range, but using another operating wavelength range does not present any problem since the FBG is used by optimizing its transmission characteristic for the operating wavelength range used.

The slope of the FBG transmission characteristic varies according to the length of the DCF used; that is, as the length of the DCF increases, the slope becomes steeper, and therefore, the slope must be optimized for each DCF used. Usually, in a long-distance transmission system, optical repeaters are arranged with a repeater spacing of 40 km, 60 km, 80 km, or other standard length. DCFs are also available with dispersion amounts appropriate to such standard repeater spacings, and a suitable one is selected for use. Here, if several FBGs appropriate to the respective DCFs are prepared and selected for use, flatness can be obtained for the loss characteristic without relying on the DCF amount (length). This also applies to other equalizing filters hereinafter described.

As for the temperature characteristic, if temperature causes a problem, the problem can be avoided by providing the transmission characteristic with a linear slope. By so doing, if the temperature changes, the slope remains unchanged and only the loss changes; in this way, flatness can be substantially maintained. The loss change does not present a problem if the optical amplifier is ALC controlled according to the amount of change of the loss. The same applies to other embodiments described hereinafter. Further, when optimizing the slope, the system may be designed to even out the repeater output by optimizing the total slope in the optical amplifier plus the DCF considering the tilt (slope) within the optical amplifier, rather than optimizing the design only for the slope occurring within the DCF. This also applies to the embodiments hereinafter described.

Figure 8:
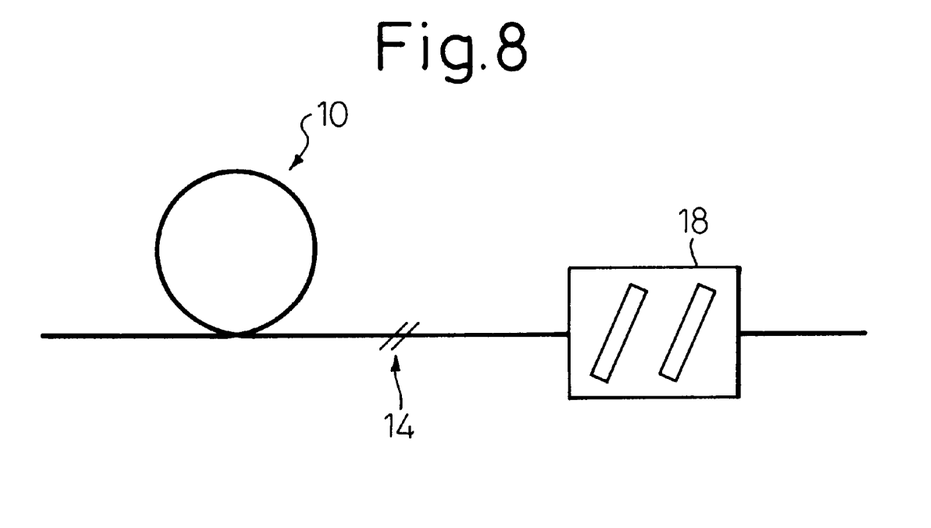
FIG. 8 is a diagram showing a dispersion compensation apparatus according to a second embodiment of the present invention.

FIG. 8 shows a second embodiment of the present invention. This embodiment uses a Fabry-Perot etalon filter 18 as the equalizing filter. The slope that occurred in the DCF can be canceled by optimizing the design so that the etalon filter has a transmission characteristic opposite to the wavelength-loss characteristic of the DCF. An example in which a flatness of 0.17 dB was obtained using an etalon filter, though it was employed as a gain equalizer for an optical amplifier, has already been reported (Oguma, et al., '96 Autumn National Convention of The Institute of Electronics, Information and Communication Engineers, B1093).

Figure 9:
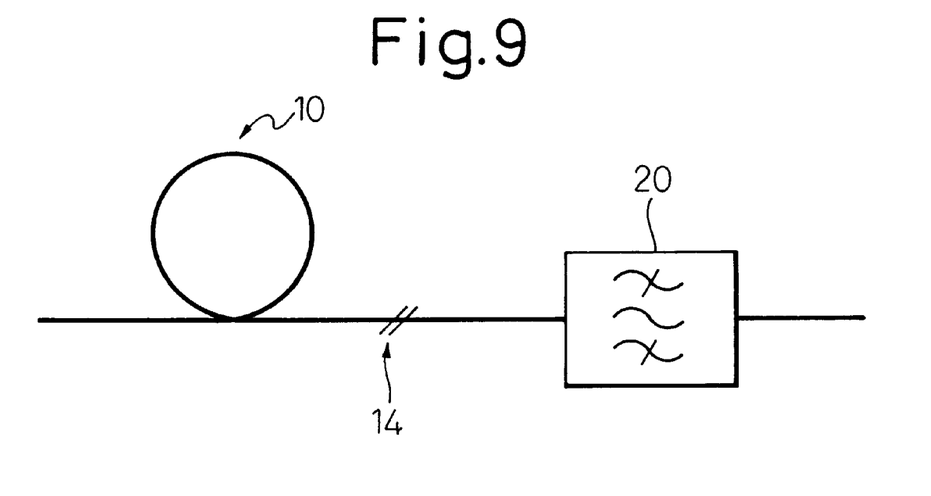
FIG. 9 is a diagram showing a dispersion compensation apparatus according to a third embodiment of the present invention.

FIG. 9 shows a third embodiment of the present invention. This embodiment uses a multilayer dielectric filter 20 as the equalizing filter. By optimizing the design so that the filter has a transmission characteristic opposite to the wavelength-loss characteristic of the DCF, as in the case of the etalon filter, the slope that occurred in the DCF can be made flat.

Figure 10:
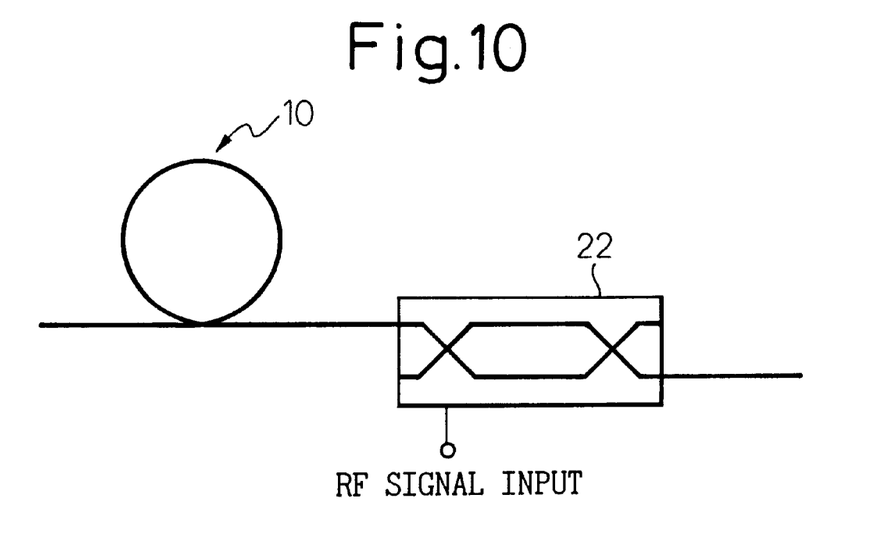
FIG. 10 is a diagram showing a dispersion compensation apparatus according to a fourth embodiment of the present invention.
Figure 11:
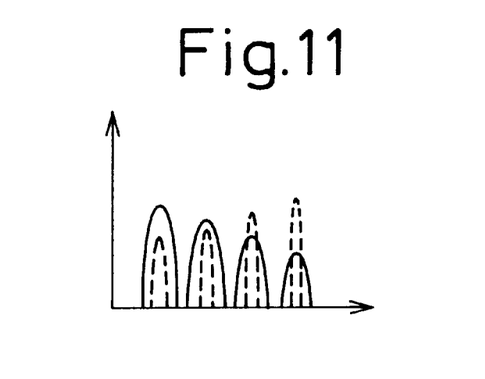
FIG. 11 is a diagram showing one example of the transmission characteristic of an AOTF.

FIG. 10 shows a fourth embodiment of the present invention. This embodiment concerns the configuration where an acousto-optical tunable filter (AOTF) 22 which utilizes an acousto-optical effect is used as the equalizing filter. When a certain designated RF frequency is input to the AOTF 22, light at a wavelength corresponding to that frequency can be transmitted selectively, and by controlling the power of the input RF signal, the transmittance can be controlled (Nakazawa, et al., Transactions of the Institute of Electronics, Information and Communication Engineers, OPE96–123, pp. 79–84, 1996). Further, by inputting a plurality of RF signals, transmission of light of a plurality of wavelengths can be controlled. When using an AOTF, a slope filter can be constructed by making the half-value width larger and by using a shoulder of the transmission characteristic. Further, since multiple wavelengths can be controlled simultaneously, the transmission characteristic can be made so that only light at and near the multiple wavelengths is transmitted, with their peak values varied in sloping fashion, as shown in FIG. 11. In FIG. 11, dashed lines show the spectra of the optical signals output from the DCF 10.

Further, since the transmittance can be controlled freely, the transmission characteristic of the AOTF can be controlled by the frequency and power of the RF signal in accordance with the slope that changes with the DCF amount (length).

II. Approach that actively evens out the losses in the dispersion-compensating fiber (DCF)

Figure 12:
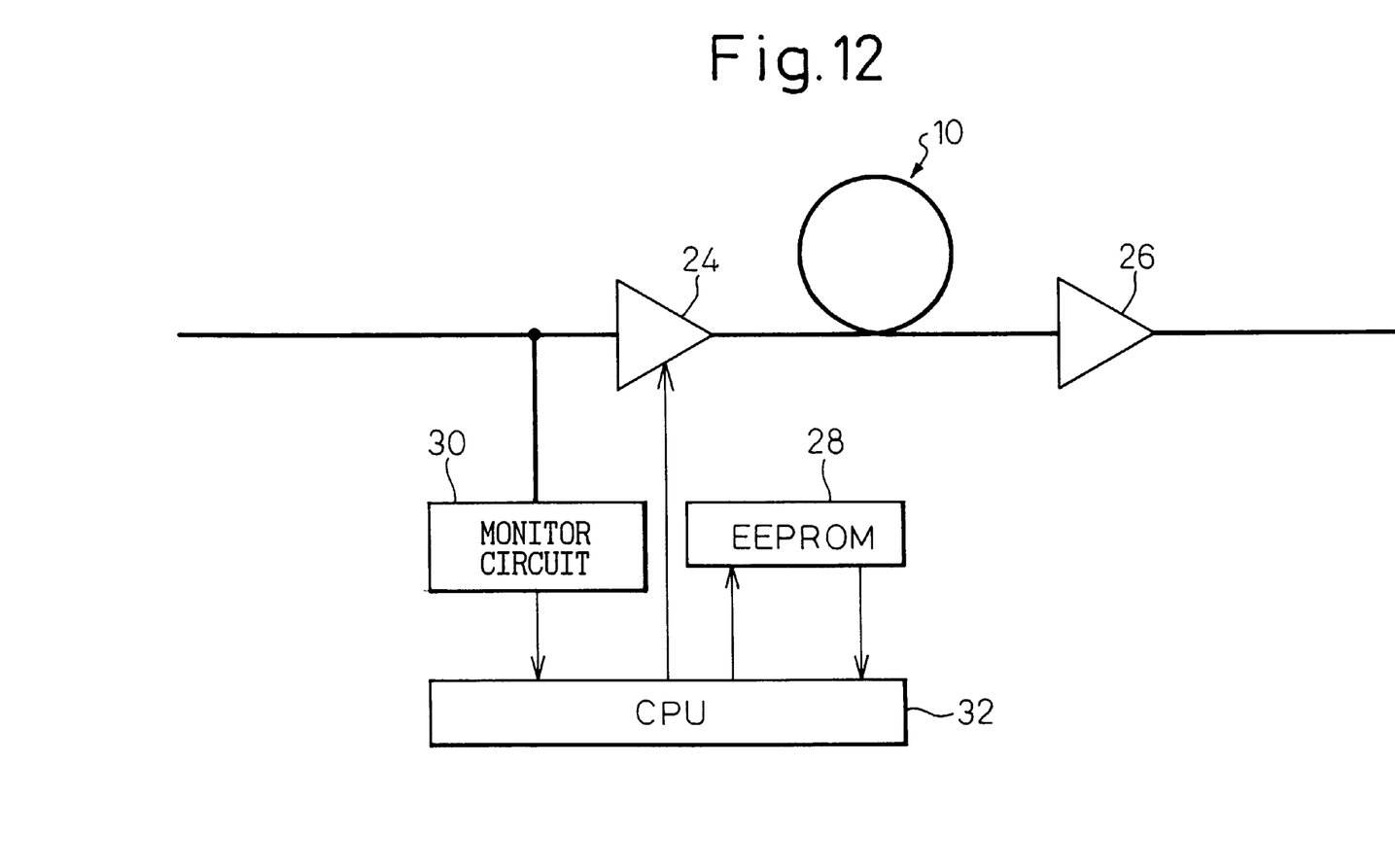
FIG. 12 is a diagram showing a dispersion compensation apparatus according to a fifth embodiment of the present invention.

FIG. 12 shows a fifth embodiment of the present invention.

DCF is used to compensate for dispersion in a transmission line, and each fibr is usually installed with an in-line optical amplifier. Since DCF has a large loss, the in-line optical amplifier is constructed with two stages of amplifiers (24 and 26) sandwiching the DCF 10 between them, as shown in FIG. 12.

Usually, a WDM optical amplifier repeater is required to evenly amplify a WDM signal; however, the slope of the WDM optical amplifier repeater changes when its gain is varied. More specifically, if the gain is increased by increasing the intensity of pumping light, the gain increase is larger in the shorter wavelength region than in the longer wavelength region, and if the gain is reduced, the gain reduction is larger in the shorter wavelength region than in the longer wavelength region. Using this property, the first-stage optical amplifier 24 is controlled by adjusting the pumping light intensity so that the optical amplifier 24 has such a gain characteristic that it can compensate for the loss characteristic of the DCF 10.

In the 1530 nm to 1570 nm wavelength range, the DCF has the characteristic that the loss in the longer wavelength region is greater than that in the shorter wavelength region, that is, its loss characteristic curve is downward to the right or its transmission characteristic curve is upward to the right. Accordingly, the optical amplifier 24 must have a gain characteristic whose curve is downward to the right. This characteristic can be achieved, for example, by doping phosphorous (P) into an erbium-doped fiber (EDF) in the optical amplifier (T. Kashiwada, et al., OFC '95 Tupl, 1995).

If the length or the compensation amount of the DCF is known, it is possible to know the loss characteristic of the DCF beforehand. Also, since the repeaters are usually arranged with a standard repeater spacing such as 40 km, 60 km, or 80 km, and the DCF of a length appropriate to the repeater spacing is installed in each repeater section, if it is known which standard repeater spacing is employed, the loss characteristic of the installed DCFs can be determined. For that purpose, the relationship between the DCF length or compensation amount and the pumping light intensity that provides the optimum gain characteristic is prestored in an EEPROM 28, as shown in FIG. 12. A monitor circuit 30 monitors the input signal power; since the standard repeater spacing corresponding to the length of the repeater section can be determined from the value of the monitored signal power, it is possible to estimate the length of the installed DCF from that value. In this way, CPU 32 estimates the length of the DCF, determines the optimum pumping light intensity from the estimated value on the basis of the data stored in the EEPROM 28, and sets the optical amplifier 24 accordingly.

As an alternative, the front-stage optical amplifier may be preset in an optimum pumping condition when installing the DCF 10, and provisions may be made to maintain that condition at all times. In this case, the CPU 32 and the EEPROM 28 can be omitted.

Further, when using phosphorous-doped optical fiber, a plurality of fibers differing in the amount of phosphorous doping may be prepared in advance, and the fiber with the doping amount appropriate to the DCF used may be used in the optical amplifier, instead of changing the pumping light intensity.

Thus, according to the present invention, a dispersion compensator without wavelength-dependent loss can be achieved, making it possible to perform WDM transmission free from variations in transmission characteristics among channels.

What is claimed is:

1. A dispersion-compensation apparatus comprising:
   a dispersion-compensating fiber compensating a chromatic dispersion in an optical transmission line, the dispersion-compensating fiber having a transmission characteristic introducing uneven losses in a signal transmitted therethrough; and
   a compensating element having a transmission characteristic effectively canceling out the losses introduced by the transmission characteristic of the dispersion-compensating fiber and thereby compensating for wavelength dependent losses in said dispersion-compensating fiber, so that the wavelength division multiplexing signal substantially free from loss differences at different wavelength is output therefrom.

2. An apparatus according to claim 1, wherein said compensating element includes a passive device having a characteristic that compensates for the wavelength dependent losses in said dispersion-compensating fiber.

3. An apparatus according to claim 2, wherein said passive device is a fiber Bragg grating.

4. An apparatus according to claim 3, wherein said fiber Bragg grating is a transmission-type fiber Bragg grating installed in series with said dispersion-compensating fiber.

5. An apparatus according to claim 4, wherein said transmission-type fiber Bragg grating is formed in a portion of a core of an optical fiber forming said dispersion-compensating fiber.

6. An apparatus according to claim 5, wherein said passive device has a further characteristic that compensates for the wavelength dependence of the gain of an optical amplifier connected in series to said dispersion-compensating fiber.

7. An apparatus according to claim 4, wherein said passive device has a further characteristic that compensates for the wavelength dependence of the gain of an optical amplifier connected in series to said dispersion-compensating fiber.

8. An apparatus according to claim 3, wherein:
   said fiber Bragg grating is a reflection-type fiber Bragg grating; and
   said apparatus further comprises an optical circulator having one port coupled to an end of said dispersion-compensating fiber and another port coupled to said reflection-type fiber Bragg grating.

9. An apparatus according to claim 8, wherein said passive device has a further characteristic that compensates for the wavelength dependence of the gain of an optical amplifier connected in series to said dispersion-compensating fiber.

10. An apparatus according to claim 3, wherein said fiber Bragg grating is a reflection-type fiber Bragg grating, said apparatus further comprising:
    an optical circulator having one port coupled to a first end of said dispersion-compensating fiber; and
    said reflection-type fiber Bragg grating is coupled to a second end of said dispersion-compensating fiber.

11. An apparatus according to claim 10, wherein said passive device has a further characteristic that compensates for the wavelength dependence of the gain of an optical amplifier connected in series to said dispersion-compensating fiber.

12. An apparatus according to claim 3, wherein said passive device has a further characteristic that compensates for the wavelength dependence of the gain of an optical amplifier connected in series to said dispersion-compensating fiber.

13. An apparatus according to claim 2, wherein said passive device is a Fabry-Perot etalon filter.

14. An apparatus according to claim 12, wherein said optical amplifier includes an optical fiber doped with phosphorus as well as erbium.

15. An apparatus according to claim 2, wherein said passive device is a multilayered dielectric filter.

16. An apparatus according to claim 15, wherein said passive device has a further characteristic that compensates for the wavelength dependence of the gain of an optical amplifier connected in series to said dispersion-compensating fiber.

17. An apparatus according to claim 2, wherein said passive device is an acousto-optical tunable filter.

18. An apparatus according to claim 17, wherein said passive device has a further characteristic that compensates for the wavelength dependence of the gain of an optical amplifier connected in series to said dispersion-compensating fiber.

19. An apparatus according to claim 2, wherein said passive device has a further characteristic that compensates for the wavelength dependent gain of an optical amplifier connected in series with said dispersion-compensating fiber.

20. An apparatus according to claim 1, wherein said compensating means includes an optical amplifier connected in series with said dispersion-compensating fiber and having a wavelength dependent gain compensating for the wavelength dependent losses in said dispersion-compensating fiber.

21. An apparatus according to claim 20, further comprising:
   a detection circuit detecting input signal light power; and
   a controller setting in said optical amplifier the wavelength dependent gain of said optical amplifier that is determined, based on said detected input signal light power.

22. An apparatus according to claim 21, wherein said optical amplifier includes an optical fiber doped with phosphorus as well as erbium.

23. An apparatus according to claim 20, wherein said optical amplifier includes an optical fiber doped with phosphorus as well as erbium.

24. A dispersion compensation apparatus as recited in claim 1, wherein the passive device comprises an equalizing filter.

* * * * *